(12) United States Patent
Martinez et al.

(10) Patent No.: US 8,132,253 B2
(45) Date of Patent: Mar. 6, 2012

(54) MEMORY SECURITY OVERRIDE PROTECTION FOR MANUFACTURABILITY OF INFORMATION HANDLING SYSTEMS

(75) Inventors: Ricardo L. Martinez, Austin, TX (US); Richard Brian Wallace, Pflugerville, TX (US); Joshua N. Alperin, Round Rock, TX (US); Charles Marion Ueltschey, III, Beaverton, OR (US)

(73) Assignee: Dell Products L.P., Round Rock, TX (US)

( * ) Notice: Subject to any disclaimer, the term of this patent is extended or adjusted under 35 U.S.C. 154(b) by 912 days.

(21) Appl. No.: 12/148,643

(22) Filed: Apr. 21, 2008

(65) Prior Publication Data

US 2009/0265792 A1   Oct. 22, 2009

(51) Int. Cl.
*G06F 21/00* (2006.01)
(52) U.S. Cl. .......................................... 726/16; 713/189
(58) Field of Classification Search .................. 713/1, 2, 713/100, 187, 191; 726/16, 17, 19, 29; 711/100, 711/147, 152, 154, 163, 164, 166, 167, 170; 710/1, 22, 23, 308
See application file for complete search history.

(56) References Cited

U.S. PATENT DOCUMENTS

| 5,022,077 A | 6/1991 | Bealkowski et al. ............. 380/4 |
| 5,471,674 A * | 11/1995 | Stewart et al. ..................... 713/2 |
| 5,579,522 A | 11/1996 | Christeson et al. ............ 395/652 |
| 5,778,070 A | 7/1998 | Mattison .......................... 380/25 |
| 5,844,986 A | 12/1998 | Davis ................................. 380/4 |
| 6,009,524 A | 12/1999 | Olarig et al. ................... 713/200 |
| 6,560,706 B1 | 5/2003 | Carbajal et al. ............... 713/155 |
| 6,564,317 B1 | 5/2003 | Hale et al. .......................... 713/1 |
| 6,591,362 B1 | 7/2003 | Li ...................................... 713/1 |
| 6,976,136 B2 | 12/2005 | Falik et al. ..................... 711/152 |
| 7,017,040 B2 | 3/2006 | Singer et al. ...................... 713/2 |
| 7,203,831 B2 | 4/2007 | Wu et al. ......................... 713/100 |
| 2004/0003265 A1 | 1/2004 | Freeman et al. ............. 713/191 |
| 2004/0193865 A1 | 9/2004 | Nguyen et al. .................... 713/2 |
| 2004/0268025 A1 * | 12/2004 | Matsubara et al. ........... 711/103 |
| 2005/0228980 A1 * | 10/2005 | Brokish et al. .................... 713/2 |
| 2006/0294349 A1 | 12/2006 | Spottswood ...................... 713/1 |
| 2007/0220244 A1 | 9/2007 | Mahmoud et al. ................ 713/2 |

* cited by examiner

*Primary Examiner* — Gilberto Barron, Jr.
*Assistant Examiner* — Abdulhakim Nobahar
(74) *Attorney, Agent, or Firm* — O'Keefe, Egan, Peterman & Enders, LLP

(57) ABSTRACT

Systems and methods are disclosed for providing memory security override protection for improved manufacturability of information handling systems. A security authentication system is added to a software driven security override signal for unlocking programmable memory circuitry, such as flash memory, according to security protection techniques associated with the Intel AMT (Active Management Technology) architecture. This security authentication system disclosed requires authentication of software security override requests before they are allowed. More particularly, the systems and methods disclosed add specific BIOS (Basic Input Output System) code to check the security override status and the software security override request signals on boots of the computer system to make sure these requests are not coming from rogue elements within the computer system. If the authentication is validated, then the programmable memory circuitry is unlocked on the next boot of the system to allow for reprogramming.

17 Claims, 4 Drawing Sheets

MEMORY SECURITY OVERRIDE PROTECTION FOR MANUFACTURABILITY OF INFORMATION HANDLING SYSTEMS

TECHNICAL FIELD

The techniques described herein relate to systems and methods for remotely managing computer systems in a secure manner.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured for remote management. One such remote management system is the Intel AMT (Active Management Technology) architecture. Platforms supporting the Intel AMT architecture employ a hardware flash memory protection mechanism that can be enabled at the end of the manufacturing process. Once invoked, this mechanism prohibits host writes to lockable portions of programmable memory (such as flash memory) within the system (i.e., certain non-BIOS regions of the flash memory) for the lifetime of the motherboard. The only method to override this locking mechanism, as set forth in the AMT architecture, is to open the computer system chassis and install a physical jumper on the motherboard to toggle the security override signal on the motherboard chipset. According to the AMT architecture, the detection of this security override signal is latched only on a system power cycle. This security override architecture, therefore, does not allow unlocks of the flash memory unless the motherboard is physically accessed in order to install the jumper.

The lack of dynamic unlocking in the AMT architecture (i.e., requirement for physical access and jumper installation) can become a major issue in the manufacturing teardown process where a "locked" system may be rerouted back through the manufacturing flow to be re-imaged with a new image. To allow improved manufacturability of the computing platform, a programmable GPIO (General Purpose Input Output) output pin has been used to provide the security override signal on the chipset for the motherboard. This GPIO output signal can then be toggled through the use of a factory loaded software tool to unlock the flash memory in a dynamic fashion. The factory tool can then cycle the power to the system to latch the security override signal when necessary.

FIG. 2 (Prior Art) is a block diagram for a prior implementation for an information handling system 200 using a software-based override mechanism for unlocking programmable memory, such as flash memory, using the AMT architecture. As depicted, programmable memory circuitry 202, such as flash memory, is coupled to control circuitry 210. The programmable memory circuitry 202 includes a lockable area 204 and a BIOS area 206. Within the BIOS area 206 is also stored a software override module 208 that can be loaded into the BIOS, for example, during manufacturing. Control circuitry 210 provides BIOS control and lock control signals 212 to the programmable memory circuitry 202. According to the Intel AMT solution, a physical override mechanism 216, such as a jumper, provides an override signal 218 as input 220 to the control circuitry 210. When this override signal is applied as a signal input 220, the control circuitry 210 provides an unlock signal to the programmable memory circuitry 202 through signal lines 212. This unlock signal acts to unlock the lockable area 204 to allow it to be written or rewritten with desired code. The software override module 208 can operate to provide signals to the control circuitry 210 through signal lines 212 that instruct the control circuitry 210 to output a software override signal 214 as an output. When asserted, this software override signal 214 is used to provide a security override signal as an input 220 to the control circuitry 210, thereby acting as if the physical override mechanism 216 has been engaged. And as indicated above, the software override signal 220 can be provided as an output signal from a GPIO pin associated with the control circuitry 210. It is further noted that the BIOS area itself is typically lockable using a separate locking mechanism so that it can be locked (protected).

One problem with this use of a GPIO pin output signal as a security override signal is that this technique exposes a security risk. In particular, a rogue program could toggle the GPIO output signal using standard input/output operations to provide the security override signal and thereby gain access to reprogram the programmable memory (e.g., flash memory).

SUMMARY

Systems and methods are disclosed for providing memory security override protection for improved manufacturability of information handling systems. As described herein, a security authentication system is added to a software driven security override signal for unlocking programmable memory, such as flash memory, configured to operate with security protection techniques associated with the Intel AMT (Active Management Technology) solution. The disclosed security authentication systems require authentication of software security override requests before they are allowed. More particularly, the systems and methods described herein add specific BIOS (Basic Input Output System) code to check the security override status and the software security override request signals on every boot of the computer system to make sure these override signals are not coming from rogue elements within the computer system. If the authentication is validated, then the flash memory is unlocked on the next boot of the system to allow for reprogramming. As described below, other features and variations can be implemented, if desired, and a related methods and systems can be utilized, as well.

DESCRIPTION OF THE DRAWINGS

It is noted that the appended drawings illustrate only exemplary embodiments of the techniques described herein and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As indicated above, some information handling systems are configured for remote management, and one such remote management system is the Intel AMT (Active Management Technology) architecture. With respect to the AMT architecture, the motherboard for a computer system is provide with a physical jumper that can used to provide a security override signal. This security override signal is provided to programmable memory on the motherboard to unlock it and to allow it to be written or re-written. In particular, the system BIOS is typically stored in programmable memory, such as flash memory, on the computer system motherboard. This programmable memory also typically includes a lockable area that contains additional important operating information for the computer system. It is this lockable area that can be unlocked with the use of the security override signal provided by the physically hardwired jumper. As also noted above, the BIOS area itself will typically have a separate locking mechanism so that it can be locked (protected) from unauthorized access.

Figure 2:
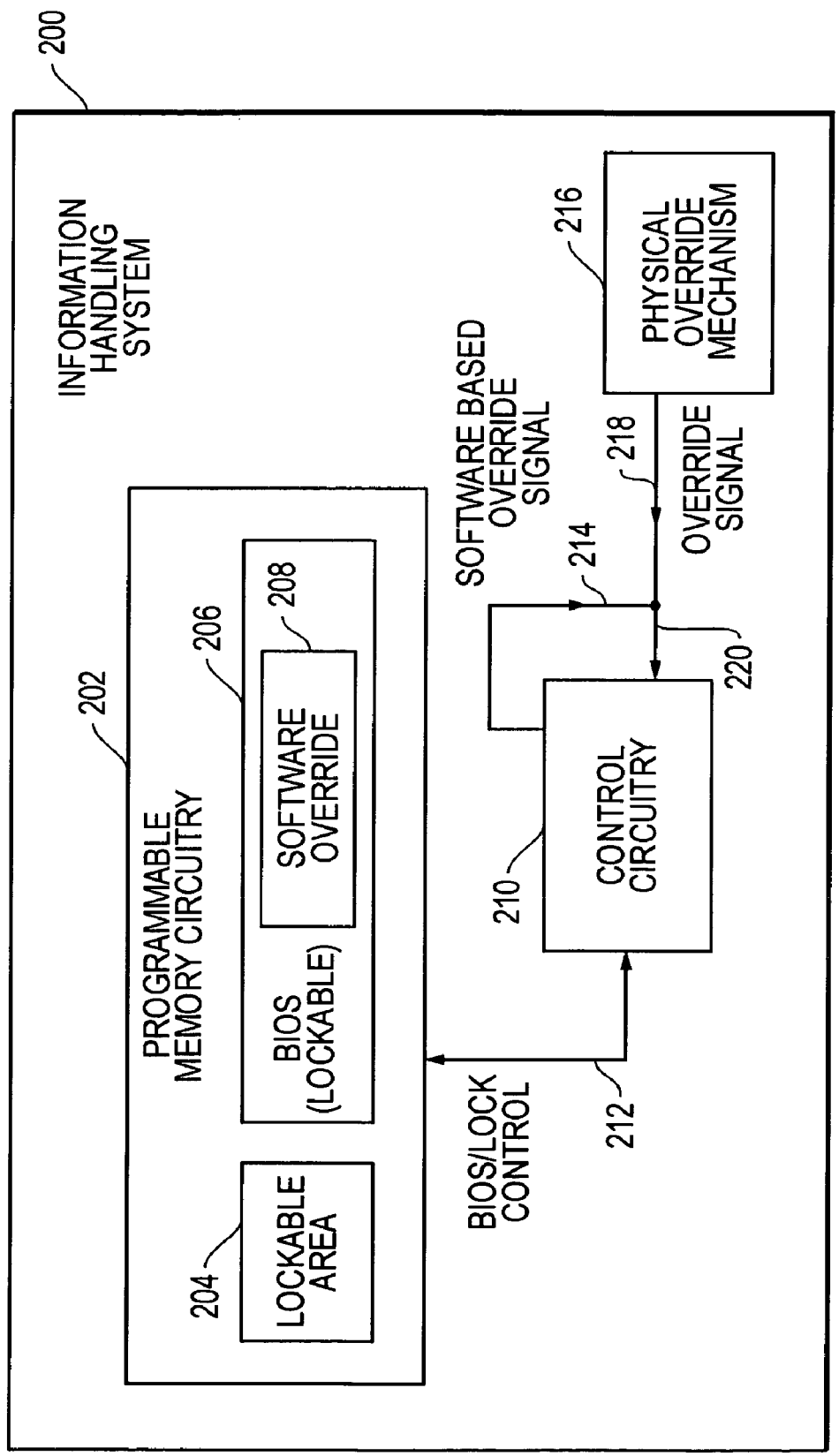
FIG. 2 (Prior Art) is a block diagram for a prior implementation using a software-based override mechanism for unlocking programmable memory, such as flash memory.

As discussed above with respect to FIG. 2 (Prior Art), a programmable GPIO (General Purpose Input Output) pin on one of the integrated circuits on the motherboard has been used before to provide a software driven -security override signal for the computer system to emulate the physical jumper provided for in the AMT architecture. This software driven security override removes the requirement for having to physically open a computer chassis and add a jumper during manufacturing configurations or reconfigurations of the software image with the lockable portion of the Flash memory. However, as described above, this software security override could be usurped by a rogue element thereby creating a potential security risk.

As described herein, a security authentication system has been added to this use of a software driven security override to protect this software driven technique from being undermined by a rogue attack. More particularly, the solution to this security problem is to add specific BIOS code to check the security override status and the security override GPIO output signal on every boot of the computer system in order to authenticate the security override request. This authentication technique takes advantage of the fact that the software override signal is latched only on a power cycle of the system. On each boot, therefore, the BIOS can be configured to distinguish between two cases: (1) the physical jumper being set by the user as contemplated in the Intel AMT architecture, or (2) the GPIO output signal being toggled by a factory tool or some other application (i.e., potentially a rogue application). In the first case, the BIOS boots as normal and the flash memory is unlocked as designed by the Intel AMT solution. In the second case, however, the BIOS will further qualify the unlock request by implementing a security authentication check.

One technique for implementing this security authentication check is for the BIOS to check the asset tag of the system. If the asset tag of the system does not indicate that the system is in manufacturing mode, then the BIOS will designate the unlock request as a rogue attack. The BIOS will then toggle the GPIO output signal back to its locked state and reset the system, disallowing any unauthorized access to the flash memory. If the system is, however, in a manufacturing mode when the BIOS checks the asset tag, then the BIOS will boot as normal and the flash memory will be unlocked to allow the factory processes to image or re-image the flash memory device on the computer system. It is noted that the manufacturing mode check can be implemented on a manufacturing platform using asset tags. In addition, other valid authorization techniques could be substituted, as desired, if asset tags are not utilized in the manufacturing process. It is also noted that the software override modules and security authentication modules described herein can be loaded into the BIOS during manufacturing.

Figure 1:
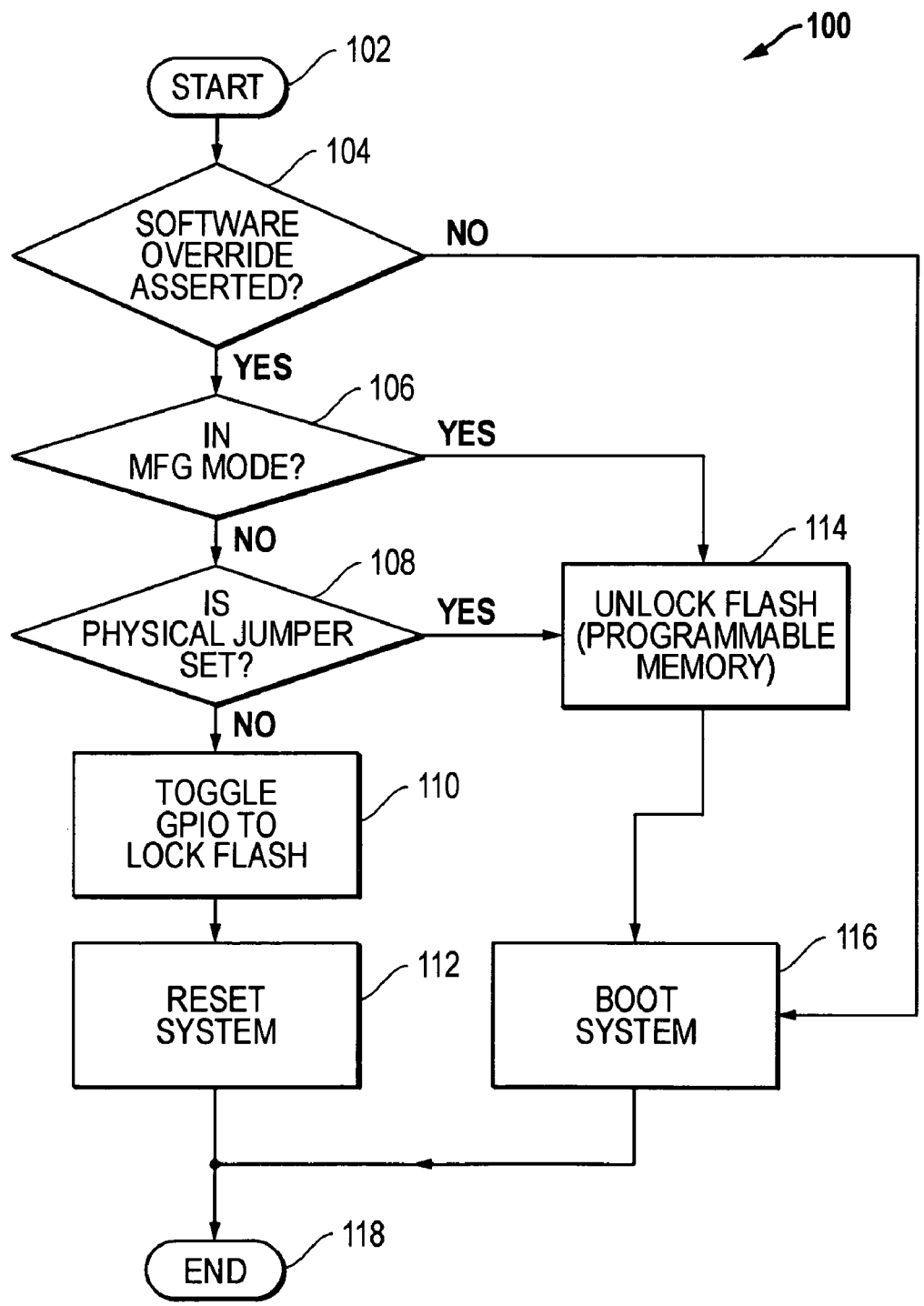
FIG. 1 is a flow diagram for providing security authentication of a software override for unlocking programmable memory, such as flash memory, as described herein.

FIG. 1 is a flow diagram of an embodiment 100 for providing security authentication of a software override for unlocking a programmable memory, such as a flash memory, as described herein. The process starts in block 102 and proceeds to decision block 104 where a determination is made whether or not software override has been asserted. If "NO," then flow passes to block 116 where the system is booted, and the process then ends in block 118. If "YES," then flow passes to decision block 106 where a determination is made whether or not the system is in manufacturing (MFG) mode. As described above, this determination can be made by looking at the asset tag for the system. If the answer in decision block 106 is "YES," then the authentication determination is validated and flow passes to block 114 where the flash memory (or other programmable memory) is unlocked. Flow then passes to block 116 where the system is booted, and the process then ends again in block 118.

It is noted that a determination of whether or not the system is in manufacturing mode can be implemented by checking to see if the asset tag (e.g., an ASCII string in the BIOS) meets certain predetermined criteria. In operation, the BIOS checks an area in the BIOS region of the flash memory (or other programmable memory) for a specific string. This string can be inserted into the flash memory when the board is built. Also, once in a special factory mode (e.g., manufacturing mode) the system can be configured so that it will not boot to a local hard drive, only to approved manufacturing devices (e.g., USB, PXE, floppy). This makes it difficult to spoof the factory mode without the user's detection, therefore increasing the security. Other implementations could be used, as desired, that rely upon internal and/or external signals/values to determine whether or not the system is in a manufacturing mode. For example, an internal notification through a programmed value could be used, or an external signal applied by a special debug device on a factory floor could be used.

If the answer in decision block 106 is "NO," a further decision block 108 is reached where a determination is made whether or not the physical jumper has been set in the system. If "YES," then the authentication determination is validated and flow passes to block 114 where the flash memory is unlocked. Flow then passes to block 116 where the system is booted, and the process then ends again in block 118. If the answer in decision block 108 is "NO," then flow passes to block 110 where the software override signal is toggled back to a lock position to thereby lock the flash memory. The system is then reset in block 112, and the process ends in block 118.

It is noted that the physical jumper can be detected on a specific pin as contemplated by the Intel AMT firmware. The jumper could also be read by the BIOS through a general purpose input. Other solutions could also be implemented, if desired.

It is further noted that determination block 106 and determination block 108 provide the security authentication described herein. Without these decision blocks, the security override would simply be effective any time the physical jumper were set and any time the software override signal were asserted. As indicated above, the determination of whether or not the system is in manufacturing mode can be determined by looking at the asset tag of the system in a manufacturing process that utilizes such asset tags to identify system status. Other authentication methods could also be used, as desired.

Still further, it is noted that the determinations made in blocks 106 and 108 of FIG. 1 could be reversed, if desired. In other words, the process could first determine if the physical jumper has been installed. If so, the security override is deemed validated. If not, then the second determine could be made of whether the system is in manufacturing mode. If so, then the security override is deemed validated. If not, then the security override is deemed not valid, and the system is reset.

Figure 3:
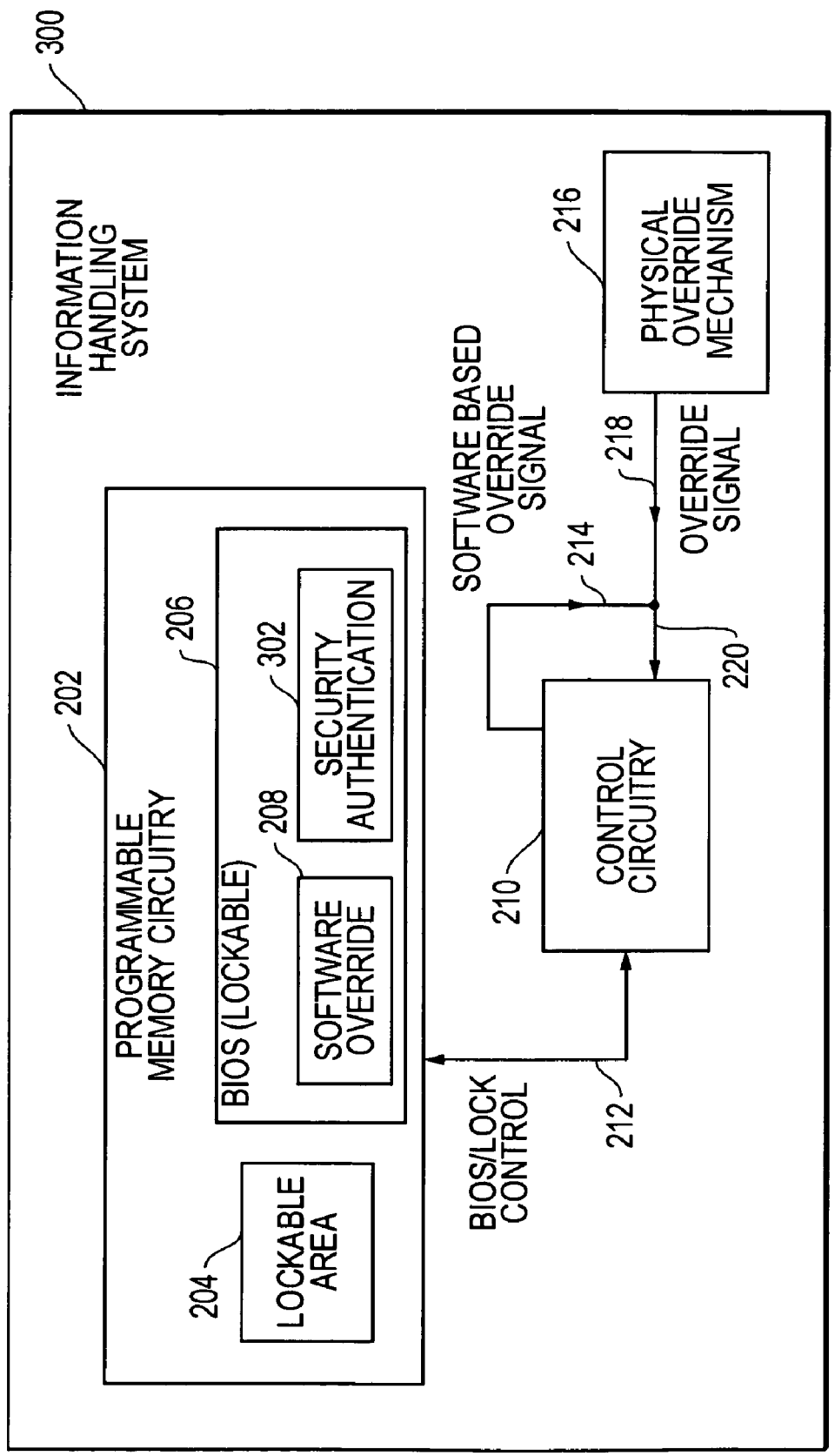
FIG. 3 is a block diagram for a system in which security authentication is provided for a software override for unlocking programmable memory, such as flash memory, as described herein.

FIG. 3 is a block diagram for a system 300 in which security authentication is provided for a software override for unlocking programmable memory, such as flash memory, as described herein. As depicted, system 300 is similar in most ways to system 200 of FIG. 2 (Prior Art). However, system 300 adds a security authentication module 302. As described above, this security authentication module 302 is used to communicate with the control circuitry to authenticate the security override signal as a legitimately asserted signal. In particular, as described with respect to FIG. 1, the security authentication module 302 can be used to make a determination of whether or not the system is in manufacturing mode, once a software override signal has been asserted, and if not, to determine if the physical jumper has been set to provide the override signal. If the jumper has not been set and the system is not in manufacturing mode, then the security override signal is deemed to have been initiated by a rogue or unauthorized element with the system.

Figure 4:
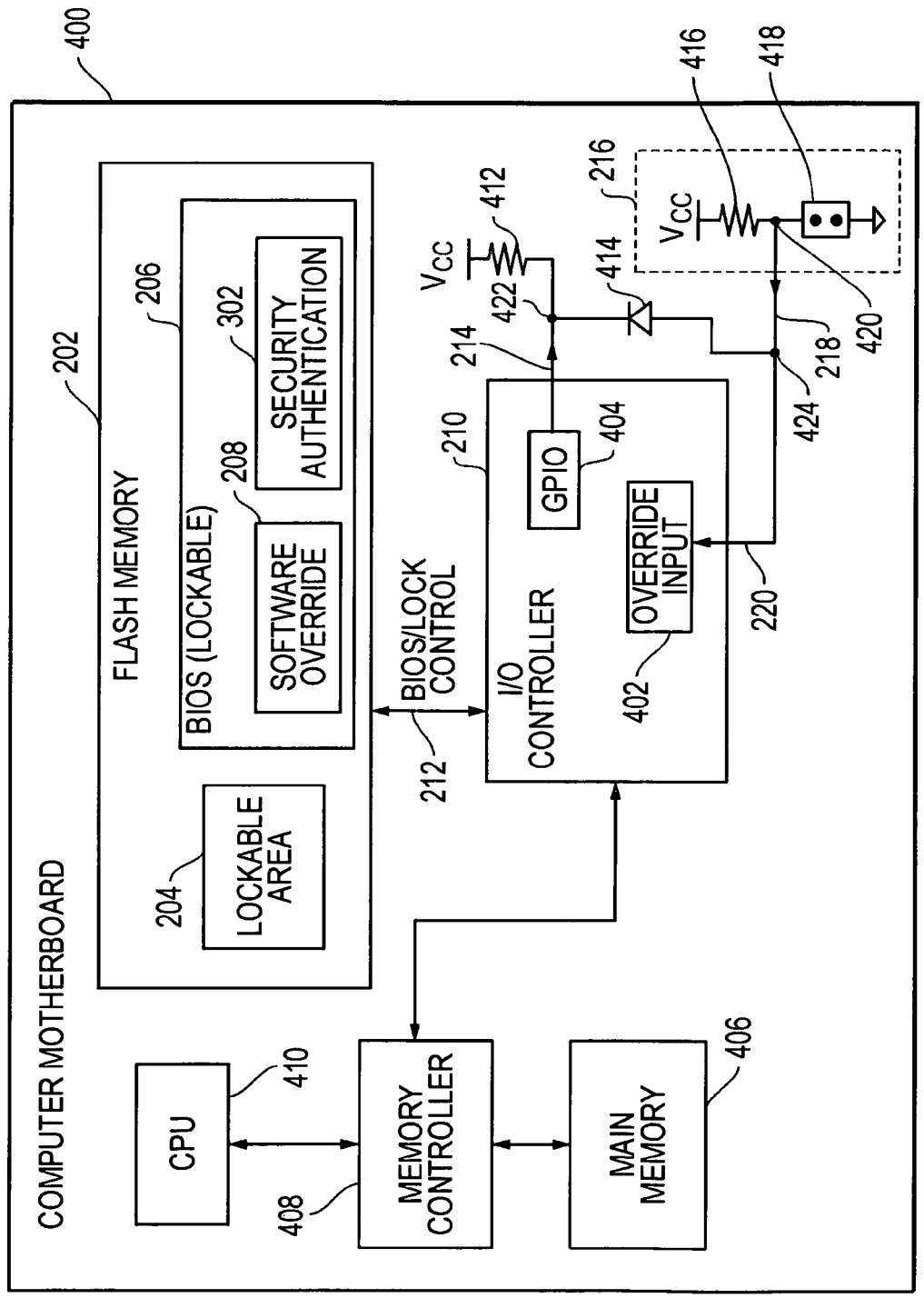
FIG. 4 is block diagram for a further embodiment of a system in which security authentication is provided for a software override for unlocking programmable memory, such as flash memory, as described herein.

FIG. 4 is block diagram for a further embodiment of a system in which security authentication is provided for a software override for unlocking programmable memory, such as flash memory, as described herein. In the embodiment depicted, a computer motherboard 400 includes in part programmable memory circuitry 202 (e.g., flash memory) coupled to an input/output (I/O) controller 210 that acts as the control circuitry of FIG. 3. The I/O controller 210 is in turn connected to a memory controller 408, which is coupled to the CPU (central processing unit) 410 and the main memory 406. The programmable memory circuitry 202 includes a lockable area 204 and a BIOS area 206, which includes the software override module 208 and the security authentication module 302. The flash memory 202 and the I/O controller 210 communicate through connections 212.

As also depicted, the I/O controller 202 includes a GPIO output driver 404 configured to provide the software based override signal 214 and an override input 402 configured to receive an input 220. The software based override signal 214 can be provided through diode 414 as the input 220. A resistor 412 is also coupled between node 422 and a voltage supply node (Vcc). In addition, a hardwired security override signal 218 can be provided as the input 220 if a jumper is attached to jumper connection point 418. The jumper connection point 418 is coupled between ground and node 420. A resistor 416 is also coupled between node 420 and a voltage supply node (Vcc). The resistor 416 and the jumper connector 418 together provide a physical override mechanism 216.

In operation, when a jumper is installed in the jumper connection point 418, a low voltage level signal from ground is forced onto node 420 to provide a low voltage level security override signal as the input 220 to the override input block 402. If a jumper is not connected, the resistor 416 provides a week pull-up from the supply voltage (Vcc) onto node 420 to provide a high voltage level signal as input 220 to the override input block 402. The override input block 402 is configured to recognize a low voltage level input as an assertion of the security override signal.

With respect to the software based security override signal 214, the resistor 412 provides a week pull-up from the supply voltage (Vcc) onto node 422 to provide a high voltage level. When the voltage level on node 422 is high, the diode 414 acts as a reverse-biased diode to isolate node 422 from node 424. The GPIO driver 404 is configured to drive the security override signal 214 as a low voltage level when assertion is desired of the security override. When node 422 is forced low, node 424 is also forced low, and the input 220 becomes a low signal level. Again, the override input block 402 is configured to recognize a low voltage level input as an assertion of the security override signal.

As discussed above, the security authorization module 302 acts to determine if the low voltage level being seen as the input 220 is a legitimate request to unlock the lockable area 204. Without the security authorization module 302, it would be possible for a rogue application to cause the I/O controller 210 to output a low voltage level through the GPIO driver 404, thereby causing a software based security override signal 214 to be asserted low. As such, the override input block 402 would see a low level asserted as an input 220, and then communicate with the programmable memory circuitry 202 through signals 212 to indicate that lockable area 204 should be unlocked. The security authorization module 302, however, intercepts this unlocking request and determines if the request is indeed legitimate.

In the embodiment discussed with respect to FIG. 4, it is assumed that a legitimate request for a security override is be expected to occur only in one of two circumstances. The first is when the physical jumper is connected to the jumper connection point 418. The second is when a software based override is asserted during manufacturing of the system. As such, the security authorization module 302 determines if the system is in manufacturing mode, for example, by looking at the asset tag status for the system. If the system is not in manufacturing mode, then the security module 302 then determines if the jumper has been installed in the jumper connection point 418. If both of these determinations are a "NO," then the security authorization module 302 concludes that a rogue application is at work, and the unlocking attempt is denied.

The I/O controller 202 or other circuitry that provides the software-based security override signal is preferably powered by auxiliary or standby power within the computer system. For example, this auxiliary or standby power could be provided by a battery within a powered computer system (e.g., one plugged into a wall socket) or could be provided as a reduced power output from a power supply of a powered computer. In this way, the computer system is not fully "on" but is in a reduced power state as the security override authorization processing is being conducted.

For the manufacturing systems contemplated herein, the asset tag is set to a manufacturing value when the system is being processed in a manufacturing environment. Once this value is written as the asset tag, on the next power down and power up, the system will come up in a manufacturing mode. In this manufacturing mode, there is typically no hardware support, and network support is not active. As such, if a remote rogue element were to force the system into a manufacturing mode to overcome the security authorization protection method described in FIG. 1, the remote rogue element would no longer have effective access to the system through a network connection. With the described embodiments, therefore, the rogue element would need to have physical access to the system to take further action after attaining a manufacturing mode and achieving an unlock of the programmable memory. If a rogue element has such physical access, then the rogue element could set the physical jumper and obtain access anyway. As such, the embodiments described herein provide advantageous protection for the most likely rogue attack which would be a remote attack through a network connection.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for authenticating security override signals to unlock a programmable memory on a computer motherboard, comprising:

generating a security override signal for a programmable memory using a software based signal or a physical override mechanism, the programmable memory being coupled to a computer motherboard for a computer system and having a lockable portion;

receiving the security override signal at control circuitry coupled to the programmable memory; sending an unlock signal from the control circuitry to the programmable memory based upon receipt of the security override signal;

authenticating the unlock signal by determining whether or not the computer system is in a manufacturing mode utilizing an asset tag for the computer system to determine if the computer system is in the manufacturing mode, wherein the asset tag is stored in the programmable memory and wherein the control circuitry is configured to access the asset tag; and unlocking the lockable portion of the programmable memory if the computer system is determined to be in the manufacturing mode.

2. The method of claim 1, wherein the generating step comprises generating the security override signal using a software based signal.

3. The method of claim 2, further comprising utilizing a programmable output associated with an integrated circuit on the motherboard to generate the security override signal.

4. The method of claim 1, further comprising generating the security override signal using a physical jumper coupled to the motherboard as a physical override mechanism.

5. The method of claim 1, further comprising further authenticating the unlock signal using a determination of whether or not a physical jumper is installed on the motherboard if the computer system is not in manufacturing mode.

6. The method of claim 1, further comprising operating basic input output system (BIOS) software in the programmable memory to perform the authenticating step.

7. The method of claim 1, wherein the receiving and sending steps are performed by an integrated circuit separate from the programmable memory.

8. The method of claim 7, wherein the generating step comprises generating the security override signal as a software based signal and the generating step is also performed by the separate integrated circuit.

9. The method of claim 1, wherein the motherboard is configured for AMT (Active Management Technology) operation.

10. A system for authenticating security override signals to unlock a programmable memory on a computer motherboard, comprising:

a computer motherboard for a computer system;

control circuitry on the computer motherboard configured to receive a security override signal from a physical override mechanism or as a software based signal and to generate an unlock signal;

a programmable memory on the computer motherboard having a lockable portion, the programmable memory configured to receive the unlock signal and to store basic input output system (BIOS) software, wherein the BIOS software is configured to authenticate the unlock signal by determining whether or not the computer system is in a manufacturing mode and to unlock the lockable portion if the system is determined to be in the manufacturing mode;

wherein the control circuitry is configured to use an asset tag for the computer system to determine if the computer system is in the manufacturing mode, wherein the asset tag is stored in the programmable memory.

11. The system of claim 10, wherein the control circuitry is configured to generate the security override signal based upon software control.

12. The system of claim 11, wherein a programmable output associated with an integrated circuit on the motherboard is configured to generate the security override signal.

13. The system of claim 10, wherein the physical override mechanism comprises a physical jumper coupled to the motherboard.

14. The system of claim 10, wherein the programmable memory is further configured to authenticate the unlock signal using a determination of whether or not a physical jumper is installed on the mother board if the computer system is not in manufacturing mode.

15. The system of claim 10, the control circuitry is included within an integrated circuit separate from the programmable memory.

16. The system of claim 15, wherein the control circuitry is further configured to generate the security override signal.

17. The system of claim 10, wherein the motherboard is configured for AMT (Active Management Technology) operation.

* * * * *